Figure 1:
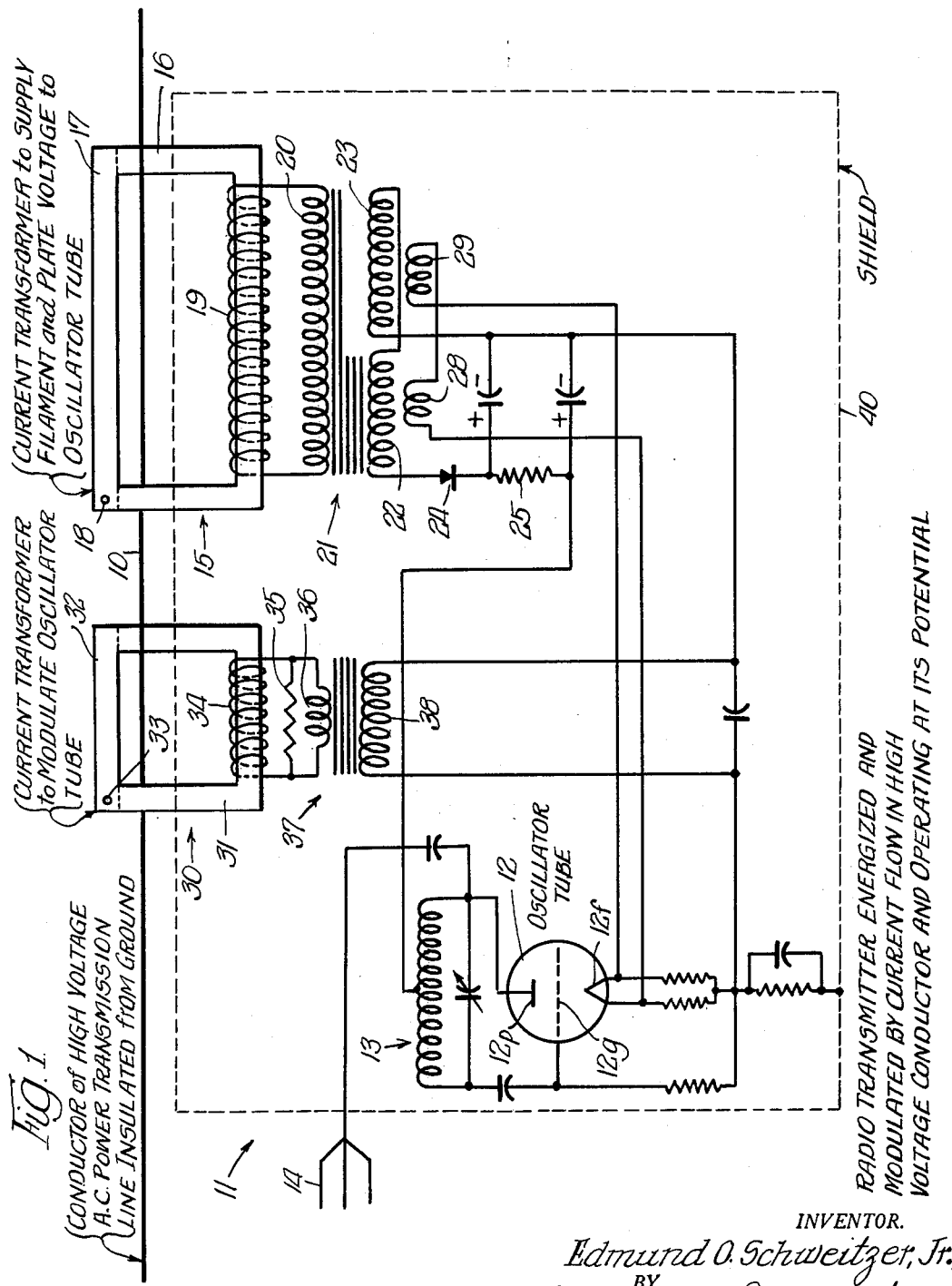

Nov. 22, 1955 — E. O. SCHWEITZER, JR — 2,724,821

REMOTE MEASURING SYSTEM

Filed July 19, 1954 — 2 Sheets-Sheet 1

INVENTOR.
Edmund O. Schweitzer, Jr.,
BY
Robert R. Lockwood
atty.

INVENTOR.
Edmund O. Schweitzer, Jr.,
BY Robert R. Lockwood
ATTY

United States Patent Office 2,724,821
Patented Nov. 22, 1955

2,724,821

REMOTE MEASURING SYSTEM

Edmund O. Schweitzer, Jr., Northbrook, Ill., assignor to E. O. Schweitzer Manufacturing Co., Inc., Northbrook, Ill., a corporation of Illinois Application July 19, 1954, Serial No. 444,010

10 Claims. (Cl. 340—201)

This invention relates, generally, to measuring systems and it has particular relation to systems for measuring the current flow in a conductor of a high voltage power transmission line and indicating the same at a remote point.

Considerable difficulty is encountered in measuring the flow of alternating current in high voltage transmission line conductors. When the circuit is energized at voltages ranging upwardly from 69 kv. to 300 kv., the equipment that must be used for conventional measurement of current flow becomes very expensive. The reason for this, of course, is the insulation problem and the necessity for insulating the measuring circuit from the high voltage energized conductor of the transmission line. Current transformers have been made for this purpose in which the primary winding has been energized by being connected in series circuit relation with the high voltage conductor and a secondary winding has been associated with the primary winding with conventional metering means being adapted to be energized therefrom. Such apparatus is exceedingly bulky and, as pointed out, is expensive.

Among the objects of this invention are: To provide for measuring the current flow in a high voltage conductor of an electric power system which shall be simple, efficient and economical and which may be readily and economically manufactured and installed; to provide for modulating the signal of a radio transmitter operating at the potential of a high voltage conductor of a power transmission system in accordance with the current flowing through the conductor and for receiving the modulated signal at a remote point, demodulating it and measuring the demodulated signal in order to obtain an indication of the magnitude of the current flow in the said conductor; to arrange the measuring system for self calibration; to employ a current transformer energized by current flow through the conductor and providing a constant voltage for energizing the radio transmitter; and to employ another current transformer for modulating the radio transmitter in accordance with the current flow through the conductor.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

Figure 2:
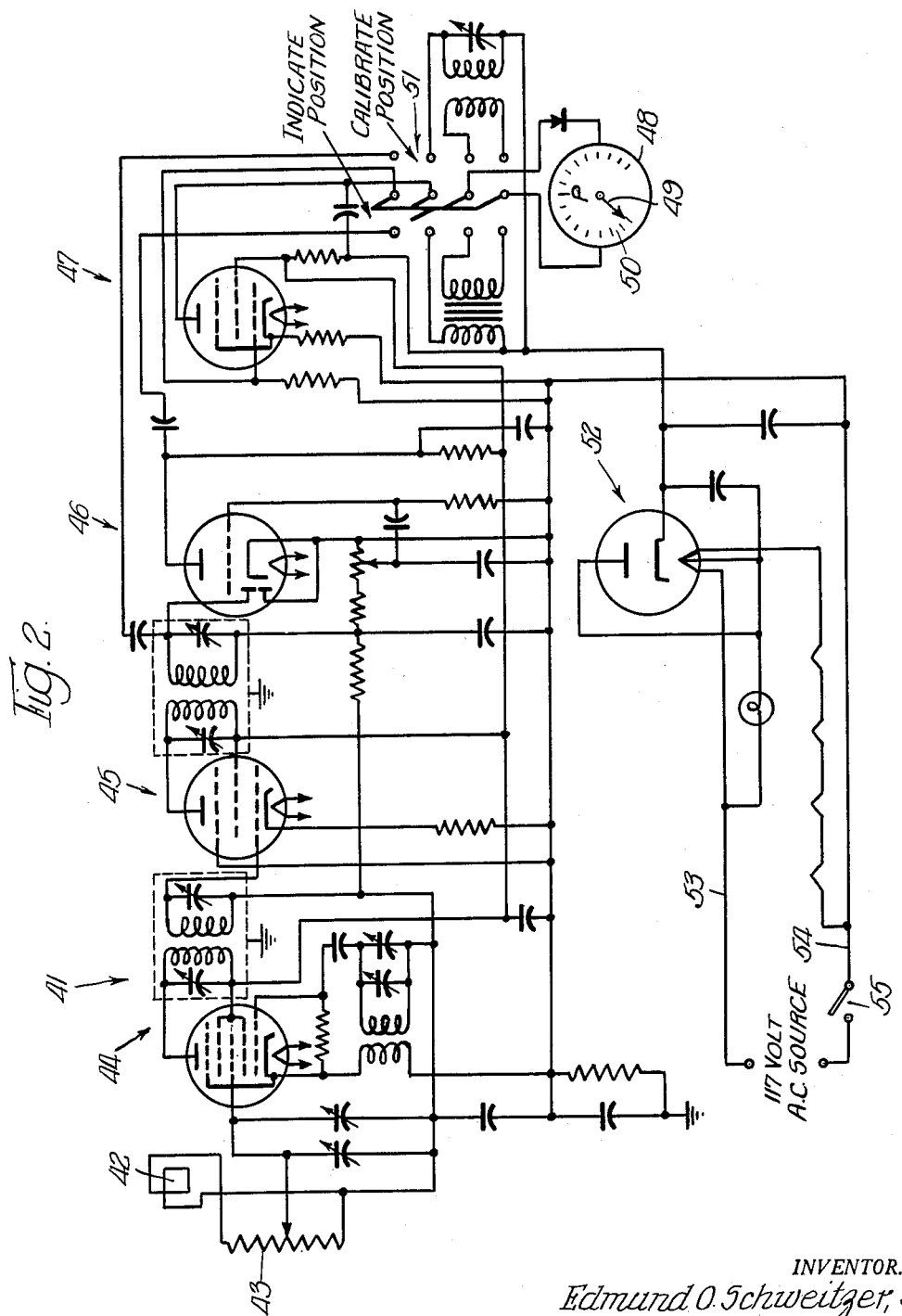

For a more complete understanding of the nature and scope of this invention reference can be had to the following detailed description, taken together with the accompanying drawings, in which:

Figure 1 illustrates diagrammatically the radio transmitter that can be mounted on the high voltage conductor or mounted to operate at its potential and requiring no insulation from ground other than the insulation provided for the high voltage conductor; and Figure 2 illustrates diagrammatically a conventional radio receiver which has been modified to receive the modulated signal transmitted by the radio transmitter shown in Figure 1 for indicating by a suitable instrument the amount of current flowing in the high voltage conductor.

Referring now particularly to Figure 1 of the drawings it will be observed that the reference character 10 designates a conductor of a high voltage alternating current power transmission line that is suitably insulated from ground by insulation proportioned to the voltage at which the conductor 10 is energized. For example, the conductor 10 may be energized at a voltage of 110 kv. with 60 cycle alternating current. This voltage is mentioned by way of illustration, it being understood that higher and lower voltages can be employed in practicing this invention without departing from the spirit and scope thereof.

Instead of providing metering means as is usually the case directly connected to a current transformer energized from the conductor 10, a radio transmitter, shown generally at 11, is employed and it is not only mounted to operate at the potential of the conductor 10 but also provision is made for energizing the radio transmitter 11 from current flowing through the conductor 10 so that it is unnecessary to provide for insulating the radio transmitter 11 by any insulation other than the insulation of the conductor 10 itself. The radio transmitter 11 can be suspended from the conductor 10 or, if desired, it can be mounted on a separate insulator which will provide insulation equivalent to that provided by the insulation of the conductor 10. However, it is unnecessary to provide other insulation since no attempt is made to employ a measuring winding inductively related to the conductor 10. Rather, radio signals are transmitted by the radio transmitter 11 which are modulated in accordance with the flow of current through the conductor 10 to a radio receiver at a remote point which will be described hereinafter. The radio receiver demodulates the signals and provides an indication of the demodulated signal which corresponds to the current flow through the conductor 10.

The radio transmitter 11 may include an oscillator tube, shown generally at 12, having a filament 12f, a grid 12g and a plate 12p. Associated with the plate 12 p is a tuning circuit shown generally at 13 to which an antenna 14 is connected. The oscillator tube 12 and associated tuning circuit 13 together with the antenna 14 provide a low power radio transmitter which can be used for communication to a remote point located in the immediate vicinity. For example the transmitter 11, as described, will have sufficient power to reach a receiver located on the ground underneath the conductor 10 or a short distance away from the transmission line in a power house or sub-station. The frequency at which the antenna 14 is energized is determined by the adjustment of the tuning circuit 13 as will be understood readily.

With a view to energizing the plate and filament circuits for the oscillator tube 12 from current flow through the conductor 10 a current transformer, shown generally at 15, can be employed. The transformer 15 includes a core 16 of laminated magnetic material having one leg 17 hinged at 18 to the balance of the core for the purpose of facilitating the application of the core to the conductor 10. It will be understood that the conductor 10, as shown, extends through the window in the core 16 and thereby constitutes a single turn of primary winding for the magnetic circuit provided by the core 16. A secondary winding 19 is wound on one of the legs of the core 16 and it is arranged to energize a primary winding 20 of a constant voltage transformer that is shown, generally, at 21. The constant voltage transformer 21 is of conventional construction and is provided with saturating magnetic circuits which are arranged in conjunction with the secondary windings to energize the same at a constant voltage over wide variations of current flow through the conductor 10.

The constant voltage transformer 21 is provided with series connected constant voltage secondary windings 22 and 23 which are connected through a rectifier 24 and a resistor 25 to energize the plate circuit of the oscillator tube 12. The constant voltage transformer 21 also is provided with series connected constant voltage secondary windings 28 and 29 which are connected, as shown, to energize the filament circuit of the oscillator tube 12 including the filament 12f.

It is desirable to modulate the plate circuit of the oscillator tube 12 as a function of the current flow through the conductor 10. For this purpose a current transformer, shown generally at 30, can be employed. It includes a core 31 having a leg 32 which is hinged at 33 to facilitate mounting on the conductor 10. The conductor 10 constitutes the primary winding for the current transformer 30 which has a secondary winding 34 that has a resistor 35 connected across its terminals to provide a voltage drop therebetween proportional to the current flow in the conductor 10. The secondary winding 34 is arranged to energize a primary winding 36 of a transformer, shown generally at 37, which has a secondary winding 38 that is connected in the plate circuit of the oscillator tube 12. In this way the output of the oscillator tube 12 is modulated as a function of the current flow through the conductor 10 and this modulated signal is transmitted from the antenna 14. A frequency multiplying transformer can be used in lieu of the voltage modulating transformer 37 to distinguish from interference at the frequency of the current in the conductor 10 and to improve operation with the receiving circuit to be described. The modulation can be applied to the grid circuit of the tube 12 rather than to the plate circuit as described.

A shield 40 encloses the radio transmitter 11 and the windings of the transformers 15 and 30, as shown, in order to prevent the introduction of extraneous voltages which might be picked up by the oscillator tube 12 or its associated circuits. As indicated, the radio transmitter 11 and the transformers 15 and 30 together with the associated circuits can be hung directly on the conductor 10 or they can be mounted on a suitable insulator which will provide the same insulation as the line insulation. Since the oscillator tube 12 is energized by the constant voltage transformer 21 from the line conductor 10, it is unnecessary to provide any other energizing source or to provide any connections to any parts energized at a potential other than the potential of the conductor 10.

In Figure 2 of the drawings there is shown, generally, at 41 a radio receiver which employs a superheterodyne circuit. It will be understood that other receiving circuits can be employed if desired. The radio receiver 41 includes an antenna 42 with which is associated a potentiometer 43 that can be adjusted for calibrating the receiver as will be described.

Conventional receiving tubes are employed in the radio receiver 41. For example, the tube 44 is a pentagrid converter which receives the signal from the antenna 42 as adjusted by the potentiometer 43 and supplies it to an IF amplifier 45 from which they are picked up by a diode detector-audio amplifier 46. The demodulated signal is amplified by a power amplifier 47 and supplied to an indicating instrument 48 which may be a milliammeter of the D'Arsonval type. As indicated, the indicating instrument 48 has a pointer 49 which is arranged to move with respect to a scale 50 which is calibrated in amperes in conjunction with the constants of the radio transmitter 11, Figure 1, and of the radio receiver 41, Figure 2, to provide an accurate indication of the current flow in the conductor 10.

In view of the fact that the conditions under which the instrument 48 was calibrated may not always exist, it is desirable to provide for calibrating it each time that a reading is taken so that the system can be self-calibrating. For this purpose a transfer switch, as shown generally at 51, is employed. The switch 51 is a four pole double throw switch. When it is swung to the right or the calibrate position, the instrument 48 indicates the radio frequency signal strength. In order that the reading provided by the pointer 49 will accurately reflect the current flowing through the conductor 10, it is desirable that the signal strength of the radio frequency be always the same. It is for this purpose that the potentiometer 43 is employed and it is adjusted with the switch 51 in the calibrate position until the pointer 49 registers with the point P along the scale 50. Then the reading is taken by operating the switch 51 to the left or the indicate position with the potentiometer 43 left in the position just referred to. Then the position of the pointer 49 with respect to the scale 50 indicates the current flow through the conductor 10.

Initially, with the circuits shown in Figures 1 and 2 in operating condition, the switch 51 is placed in the calibrate position and the potentiometer 43 is adjusted until the pointer 49 registers with the point P. This indicates the signal strength of the radio frequency at which the scale 50 is to be calibrated. Then the switch 51 is placed in the indicate position and the current is varied in the conductor 10. Suitable indicia are applied along the scale 50 for different values of current flow corresponding to different positions of the pointer 49. Thereafter, when a reading is to be taken and the signal strength of the radio frequency is different, the switch 51, as described, is placed in the calibrate position and the potentiometer 43 is adjusted until the pointer 49 registers with the point P at which time the receiver is again operating under the conditions that it did when the scale 50 was calibrated. A true indication of the current flow in the conductor 10 then is obtained by shifting the switch 51 to the indicate position and noting the position of the pointer 49 with respect to the scale 50.

Conventional means are employed for energizing the radio receiver 41. For example, a hot cathode rectifier, shown generally at 52, can be employed for energizing the plate circuits of the several tubes in the superheterodyne circuit. The rectifier 52 can be energized by conductors 53 and 54, the latter being connected by a switch 55 for energization to a suitable alternating current source such as 117-volt source as indicated.

In operation the radio tansmitter 11 continuously transmits a modulated signal. The frequency of transmission is determined by the tuning circuit 13 and the modulation is determined by the current flow through the conductor 10.

When it is desired to obtain an indication of the current flow through the conductor 10, the switch 55, Figure 2, is closed and the radio receiver 41 is energized. First the receiver 41 is calibrated by operating the switch 51 to the calibrate position in the manner described and the potentiometer 43 is adjusted until the pointer 49 is moved to the scale position P. With the receiver 41 so adjusted, the system is in calibration and the switch 51 can be operated to the indicate position. The pointer 49 then indicates on the scale 50 the amount of alternating current flowing through the conductor 10.

The radio receiver 41 can be positioned in any convenient location at substantially ground potential and where the signal from the antenna 14 can be readily picked up with a minimum of loss. Since the receiver 41 operates substantially at ground potential, it is unnecessary to provide any particular insulation for it or to take any particular precautions with respect to it other than are normally taken with respect to apparatus operating at relatively low voltage. Ample insulation is provided between the radio receiver 41 and the conductor 10 by air and by the insulation of the conductor 10.

It will be apparent that the principal elements of the radio receiver 41 that are subject to aging are used for both calibrating the system and for making current measurements.

While the oscillator tube 12 of the thermionic type is shown, a transistor can be used in lieu thereof in which case it would be unnecessary to provide the filament circuit. Instead, an appropriate transistor bias voltage would be provided by the constant voltage transformer 21 and rectifier 24.

Since certain changes can be made in the foregoing system and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. Means for measuring the current flow in a conductor of a high voltage power transmission line and indicating the same at a remote point comprising, in combination, a radio transmitter operating at the potential of said conductor and energized and modulated by current flow therein to transmit a corresponding signal to said remote point, a radio receiver at said remote point for receiving said signal and demodulating the same, and measuring means actuated by said demodulated signal for indicating at said remote point the current flow in said conductor.

2. Means for measuring the current flow in a conductor of a high voltage power transmission line and indicating the same at a remote point comprising, in combination, a radio transmitter operating at the potential of said conductor and energized and modulated by current flow therein to transmit a corresponding signal to said remote point, a radio receiver at said remote point for receiving said signal and demodulating the same, measuring means actuated by said demodulated signal for indicating at said remote point the current flow in said conductor, and means for adjusting said radio receiver to accommodate variations in strength of said modulated signal so that said measuring means is actuable under predetermined operating conditions.

3. Means for measuring the current flow in a conductor of high voltage alternating current power transmission line and indicating the same at a remote point comprising, in combination, a radio transmitter operating at the potential of said conductor and modulated by current flow therein to transmit a corresponding signal to said remote point, current transformer means energized by current flow through said conductor and arranged and adapted to have a constant voltage output for energizing said radio transmitter, a radio receiver at said remote point for receiving said signal and demodulating the same, and measuring means actuated by said demodulated signal for indicating at said remote point the current flow in said conductor.

4. Means for measuring the current flow in a conductor of a high voltage alternating current power transmission line and indicating the same at a remote point comprising, in combination, a radio transmitter operating at the potential of said conductor and modulated by current flow therein to transmit a corresponding signal to said remote point, said radio transmitter including at least an oscillator tube and plate and filament circuits therefor, current transformer means energized by current flow through said conductor and arranged and adapted to have constant voltage outputs for energizing said plate and filament circuits, a radio receiver at said remote point for receiving said signal and demodulating the same, and measuring means actuated by said demodulated signal for indicating at said remote point the current flow in said conductor.

5. Means for measuring the current flow in a conductor of a high voltage alternating current power transmission line and indicating the same at a remote point comprising, in combination, a radio transmitter operating at the potential of said conductor and energized by current flow therein, current transformer means energized by current flow through said conductor for modulating said radio transmitter as a function of said current flow to transmit a corresponding signal to said remote point, a radio receiver at said remote point for receiving said signal and demodulating the same, and measuring means actuated by said demodulated signal for indicating at said remote point the current flow in said conductor.

6. Means for measuring the current flow in a conductor of a high voltage alternating current power transmission line and indicating the same at a remote point comprising, in combination, a radio transmitter operating at the potential of said conductor, current transformer means energized by current flow through said conductor and arranged and adapted to have a constant voltage output for energizing said radio transmitter, additional current transformer means energized by current flow through said conductor for modulating said radio transmitter as a function of said current flow to transmit a corresponding signal to said remote point, a radio receiver at said remote point for receiving said signal and demodulating the same, and measuring means actuated by said demodulated signal for indicating at said remote point the current flow in said conductor.

7. Means for measuring the current flow in a conductor of a high voltage alternating current power transmission line and indicating the same at a remote point comprising, in combination, a radio transmitter operating at the potential of said conductor, current transformer means energized by current flow through said conductor and arranged and adapted to have a constant voltage output for energizing said radio transmitter, additional current transformer means energized by current flow through said conductor for modulating said radio transmitter as a function of said current flow to transmit a corresponding signal to said remote point, a radio receiver at said remote point for receiving said signal and demodulating the same, measuring means actuated by said demodulated signal for indicating at said remote point the current flow in said conductor, and means for adjusting said radio receiver to accommodate variations in strength of said modulated signal so that said measuring means is actuable under predetermined operating conditions.

8. Means for measuring the current flow in a conductor of a high voltage alternating current power transmission line and indicating the same at a remote point comprising, in combination, a radio transmitter operating at the potential of said conductor and including at least an oscillator tube and plate and filament circuits therefor, current transformer means energized by current flow through said conductor and arranged and adapted to have constant voltage outputs for energizing said plate and filament circuits, additional current transformer means energized by current flow through said conductor for modulating said radio transmitter as a function of said current flow to transmit a corresponding signal to said remote point, a radio receiver at said remote point for receiving said signal and demodulating the same, and measuring means actuated by said demodulated signal for indicating at said remote point the current flow in said conductor.

9. Means for measuring the current flow in a conductor of a high voltage alternating current power transmission line and indicating the same at a remote point comprising, in combination, a radio transmitter operating at the potential of said conductor and including at least an oscillator tube and plate and filament circuits therefor, current transformer means energized by current flow through said conductor and arranged and adapted to have constant voltage outputs for energizing said plate and filament circuits, additional current transformer means energized by current flow through said conductor for modulating said radio transmitter as a function of said current flow to tansmit a corresponding signal to said remote point, a radio receiver at said remote point for receving said signal and demodulating the same, measuring means actuated by said demodulated signal for indicating at said remote point the current flow in said conductor, and means for adjusting said radio receiver to accommodate variations in strength of said modulated signal so that said measuring means is actuable under predetermined operating conditions.

10. Means for measuring the current flow in a conductor of a high voltage power tarnsmission line and indicating the same at a remote point comprising, in combination, a radio transmitter operating at the potential of said conductor and energized and modulated by current flow therein to transmit a corresponding signal to said remote point, a radio receiver at said remote point for receiving said signal and demodulating the same, and means actuated by said demodulated signal at said remote point in accordance with the current flow in said conductor.

No references cited.